United States Patent
Cole et al.

(10) Patent No.: US 11,815,152 B2
(45) Date of Patent: Nov. 14, 2023

(54) MOTOR DAMPENER AND DRIVE TRAIN FOR PLUMBING TOOLS

(71) Applicant: Ridge Tool Company, Elyria, OH (US)

(72) Inventors: Alex Michael Cole, Columbia Station, OH (US); Michael J. Rutkowski, North Royalton, OH (US)

(73) Assignee: Ridge Tool Company, Elyria, OH (US)

( * ) Notice: Subject to any disclaimer, the term of this patent is extended or adjusted under 35 U.S.C. 154(b) by 359 days.

(21) Appl. No.: 17/079,722

(22) Filed: Oct. 26, 2020

(65) Prior Publication Data

US 2021/0041005 A1    Feb. 11, 2021

Related U.S. Application Data

(62) Division of application No. 15/421,595, filed on Feb. 1, 2017, now Pat. No. 10,851,868.

(60) Provisional application No. 62/310,076, filed on Mar. 18, 2016.

(51) Int. Cl.

| | |
|---|---|
| *H02K 5/04* | (2006.01) |
| *F16F 15/04* | (2006.01) |
| *H02K 5/24* | (2006.01) |
| *B08B 9/045* | (2006.01) |
| *H02K 7/12* | (2006.01) |
| *F16F 15/08* | (2006.01) |
| *F16F 1/373* | (2006.01) |
| *B08B 9/047* | (2006.01) |

(Continued)

(52) U.S. Cl.
CPC .............. *F16F 15/04* (2013.01); *B08B 9/045* (2013.01); *B08B 9/047* (2013.01); *E03F 9/005* (2013.01); *F16F 1/373* (2013.01); *F16F 15/08* (2013.01); *H02K 5/04* (2013.01); *H02K 5/24* (2013.01); *H02K 7/003* (2013.01); *H02K 7/12* (2013.01); *H02K 7/125* (2013.01)

(58) Field of Classification Search
CPC .................................... H02K 5/04; H02K 5/24
See application file for complete search history.

(56) References Cited

U.S. PATENT DOCUMENTS

| | | | |
|---|---|---|---|
| 2,020,764 | A | 11/1935 | Bradford |
| 2,448,281 | A | 8/1948 | Saurer |
| 2,467,849 | A | 4/1949 | O'Brien |

(Continued)

FOREIGN PATENT DOCUMENTS

| | | |
|---|---|---|
| CN | 1181933 C | 12/2004 |
| CN | 202577502 U | 12/2012 |

(Continued)

OTHER PUBLICATIONS

German Office Action dated Sep. 20, 2022; Application No. 102017204187.0; 12 Pages.

(Continued)

*Primary Examiner* — Dang D Le
(74) *Attorney, Agent, or Firm* — Mark Bandy; Rankin Hill & Clark, LLP

(57) ABSTRACT

Motor dampening provisions are described. Incorporation and use of the motor dampener(s) in a rotary type drain cleaning machine enables elimination of a clutch in the machine. Also described are clutch-free drive systems using the motor dampener(s). Also described are torque countering members that are used in conjunction with the motor dampener(s).

16 Claims, 6 Drawing Sheets

(51) Int. Cl.
*E03F 9/00* (2006.01)
*H02K 7/00* (2006.01)

(56) References Cited

U.S. PATENT DOCUMENTS

| | | | |
|---|---|---|---|
| 4,763,374 A | | 8/1988 | Kaye |
| 5,199,129 A | | 4/1993 | Salecker et al. |
| 5,521,447 A | * | 5/1996 | Bertolini .................. H02K 5/24 |
| | | | 310/91 |
| 5,996,159 A | | 12/1999 | Irwin |
| 6,343,398 B1 | | 2/2002 | Silverman et al. |
| 7,040,520 B2 | * | 5/2006 | Turk ..................... F04D 29/668 |
| | | | 173/210 |
| 7,935,192 B2 | | 5/2011 | Silverman et al. |
| 8,931,131 B1 | | 1/2015 | Feduke |
| 9,234,342 B1 | | 1/2016 | Beesley et al. |
| 10,851,868 B2 | * | 12/2020 | Cole ..................... H02K 7/003 |
| 2015/0188383 A1 | | 7/2015 | Okada et al. |

FOREIGN PATENT DOCUMENTS

| | | |
|---|---|---|
| CN | 203346973 U | 12/2013 |
| CN | 203769019 U | 8/2014 |
| DE | 69032169 T2 | 10/1998 |
| DE | 952264 T1 | 4/2000 |
| DE | 69900223 T2 | 5/2002 |
| DE | 69625454 T2 | 8/2003 |
| EP | 724916 A1 | 8/1996 |
| WO | WO2008055154 A2 | 5/2008 |

OTHER PUBLICATIONS

Search Report dated Aug. 31, 2018; Application No. 201710146143. 7; 10 Pages.

* cited by examiner

MOTOR DAMPENER AND DRIVE TRAIN FOR PLUMBING TOOLS

CROSS REFERENCES TO RELATED APPLICATIONS

This application is a divisional application of U.S. non-provisional application Ser. No. 15/421,595 filed on Feb. 1, 2017, which claims priority from US provisional application Ser. No. 62/310,076 filed on Mar. 18, 2016.

FIELD

The present subject matter relates to motor dampeners and drive trains for use in plumbing tools such as rotary drain cleaners. The present subject matter also relates to motor driven plumbing tools such as certain drain cleaners utilizing the motor dampener and drive train.

BACKGROUND

Powered drain cleaning machines typically utilize a clutch between a motor and a mechanism for advancing or retrieving a drain cleaning cable or "snake." Incorporation of such clutches can be beneficial however, increase the complexity and cost of the machine.

Accordingly, it would be desirable to provide a drain cleaning machine that is free of a clutch yet, which provides the characteristics and/or benefits of a machine utilizing a clutch.

SUMMARY

The difficulties and drawbacks associated with previous approaches are addressed in the present subject matter as follows.

In one aspect, the present subject matter provides a clutch-free drive system. The system comprises a motor having a drive shaft rotatable about a center axis, and a motor enclosure. The system also comprises a torque countering member extending outward from the motor enclosure. The system additionally comprises a dampener member contacting the torque countering member and spaced from the center axis of the motor. The drive system is free of a clutch.

In another aspect, the present subject matter provides a drain cleaner comprising a housing defining an interior region and at least one cradle member therein. The drain cleaner also comprises a motor having a drive shaft rotatable about a center axis, and a motor enclosure. The motor is received and supported by the at least one cradle member within the interior region of the housing. The drain cleaner also comprises a torque countering member extending outward from the motor enclosure and defining a first side and an oppositely directed second side. And, the drain cleaner comprises at least one dampener member disposed between (i) one of the first side and the second side of the torque countering member, and (ii) the housing.

In yet another aspect, the present subject matter provides a drain cleaning machine free of a clutch. The drain cleaning machine comprises a first housing portion defining a first cradle member and a first receptacle. The drain cleaning machine also comprises a second housing portion defining a second cradle member and a second receptacle. The first and second housing portions are configured to engage each other and define an interior region therebetween. The drain cleaning machine also comprises a motor having a drive shaft rotatable about a center axis, and a motor enclosure. The motor is received and supported by the first cradle member and the second cradle member within the interior region of the housing. The drain cleaning machine also comprises a torque countering member extending outward from the motor enclosure and defining a first side directed toward the first housing portion and a second side directed toward the second housing portion. The drain cleaning machine additional comprises a first dampener member disposed between the first receptacle and the first side of the torque countering member. And, the drain cleaning machine also comprises a second dampener member disposed between the second receptacle and the second side of the torque countering member.

As will be realized, the subject matter described herein is capable of other and different embodiments and its several details are capable of modifications in various respects, all without departing from the claimed subject matter. Accordingly, the drawings and description are to be regarded as illustrative and not restrictive.

DETAILED DESCRIPTION OF THE EMBODIMENTS

Figure 1:
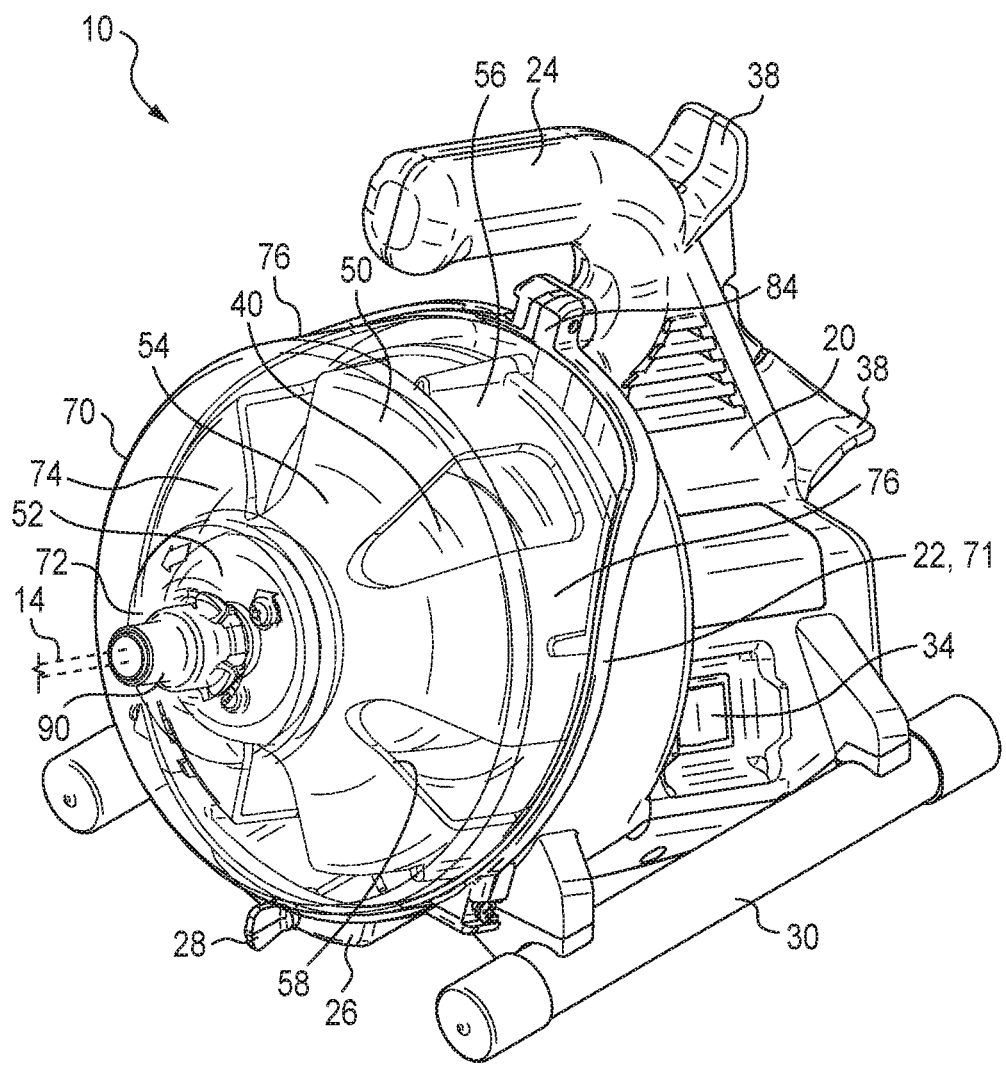
FIG. 1 is a perspective view of a drain cleaning tool in accordance with the present subject matter.

The present subject matter provides a clutch-free drive system for use in plumbing tools such as drain cleaners, and particularly rotary drain cleaners. The drive system comprises an electric motor, a torque countering member extending from the motor, and one or more dampener member(s) disposed alongside the torque countering member. The drive system is free of a clutch.

The present subject matter also provides rotary drain cleaners using such clutch-free drive systems.

In rotary or drum style drain cleaners with a direct drive between a drum and an electric motor, a high startup torque is often exhibited. This high torque is increased when the motor is turned on without a soft start or variable speed switch. This torque can result in excessive wear on the drive train and housing. The tool may "jump" when on a stationary surface or rotate when the operator is holding the tool in hand held applications. Therefore, it is common to utilize a clutch between the drive train and drum to allow for clutch slippage to accommodate the torque. However, this can result in unintended clutch slippage when the cable is "torqued up," i.e., increasing amounts of torque are applied to the cable, such as during a drain cleaning process.

In accordance with the present subject matter, one or more dampener(s) are used to absorb the startup torque and thereby eliminate the need for a clutch. This reduces cost, the number of wear parts on a drain cleaner machine, and eliminates the setup time and calibration for the clutch during assembly. Without a clutch, the cable can continue to rotate in a drain even when relatively high levels of torque are applied to the cable. The motor dampener(s) also reduces the strain on the housing and frame of the machine during startup by helping absorb the torque. In addition, the reaction torque to the work surface or operator is also reduced.

In accordance with the present subject matter, the motor dampener assembly includes a motor which is mounted such that the motor can at least partially and slightly rotate about its center axis. This aspect is described in greater detail herein. The motor is typically an electric motor powered from an electric power supply or battery. A rigid lever or torque countering member extends or otherwise protrudes from the motor and/or motor enclosure generally perpendicular to the center axis of the motor. One or more dampeners in the form of rubber, elastomeric components, and/or other biasing members are mounted in the machine frame or housing. These dampener components are oriented perpendicular to the motor's axis and offset a distance from the axis so they contact each side of the torque countering member at a 90° angle or substantially so. With the dampener components positioned on either side of the torque countering member, the motor is constrained from rotating freely.

During startup, the reaction torque will cause the motor to spin about its axis. The dampener components, which capture the torque countering member, prevent the motor from spinning while absorbing the torque. With such dampener components mounted on both sides of the motor, and more particularly the torque countering member, the torque can be absorbed in both the clockwise and counterclockwise directions.

Variations of these embodiments can include compression springs or other biasing members mounted within the frame or housing of the drain cleaner instead of, or in addition to, the dampener components, which may be rubber or elastomeric for example. The rubber or elastomeric dampener components and/or springs can also be mounted to the motor such that they contact the housing of the drain cleaner to absorb the torque.

Thus, by use of the present subject matter, the startup torque in both the clockwise and counterclockwise directions is absorbed without using a clutch. This increases the life of the drive train, housing, and frame. Torque exhibited at the work surface or transmitted to the operator is also reduced by the dampening system. A direct connection between the drive train and drum is utilized preventing slippage of the drum when the cable is torqued in the drain.

As noted, in many embodiments, the motor is mounted such that the motor as a whole, can only partially and slightly rotate about its center axis. Typically, the maximum amount of such rotation is less than 5°, and in many embodiments from 0.1° to 2°. However, it will be appreciated that the present subject matter includes other motor mounting configurations and/or allowable extents of rotation. These are maximum angular displacements of the motor which are typically exhibited at start up or during application of relatively high levels of torque to the drain cleaning cable.

FIG. 1 illustrates an embodiment of a typical drum type drain cleaner 10 in accordance with the present subject matter. The drain cleaner 10 generally comprises a housing 20, one or more base member(s) 30 along a lower region of the housing for contacting a floor or ground and supporting the cleaner, a rotatably powered drum 40 disposed within an outer drum housing 50, and a drum cover 70. The housing 20 provides a support ledge 22 which is configured to matingly engage an edge 71 of the drum cover 70, and in certain versions sealingly engage the edge 71 of the drum cover 70. As will be appreciated, a drain cleaning cable 14 is at least partially housed or stored by the drum 40 and outer drum housing 50. Rotation of the drum 40 in conjunction with a cable feed apparatus (not shown in FIG. 1) results in administration of the cable 14 out of the drum assembly 40, 50; or retraction into the drum assembly.

The housing 20 generally encloses a motor (not shown in FIG. 1) which is typically an electrically powered motor having a rotary output for providing powered rotation of the drum 40 and associated components. Also provided with and/or integrally formed with the housing 20 is a handle 24 that in many embodiments extends over a center of mass of the drain cleaner 10 to facilitate carrying or lifting of the cleaner 10 by an operator. The housing 20 can also include a sump 26 or other housing reservoir with a drain or removable plug 28. The sump 26 is typically in the form of a lowermost enclosed region of the housing 20 disposed below the drum 40 that serves to collect moisture, water, and debris. The drain 28 facilitates removal of such moisture, water, and/or debris from the sump 26, and specifically from an interior region of the sump 26.

The drain cleaner 10 typically additionally includes one or more controls and/or actuators 34 for governing or monitoring operation of the cleaner. The drain cleaner 10 may optionally include cord wrap provisions 38. In certain embodiments, the drain cleaner 10 may also include one or more provisions that provide feedback to an operator such as lights and/or gauges (not shown).

As will be understood, the drum 40 is rotatably powered by the motor and is typically in the form of a spool or cylinder. However, the present subject matter includes the use of other drum configurations such as for example, open frame carriages, polygonal configurations, and the like.

The drain cleaner 10 also includes the noted outer drum housing 50. The outer drum housing 50 defines a front 52, a rearwardly extending circumferential wall 56, and in many versions, an arcuate wall 54 extending between the front 52 and the circumferential wall 56. In many embodiments, the outer drum housing 50 defines one or more openings 58 which enable visual inspection of the drum 40 and/or a drain cleaning cable 14 generally disposed within the housing 50. The outer drum housing 50 depicted in the referenced figure is an example of an open drum housing. In certain versions of the outer drum housing 50, the housing defines at least two openings, at least three openings, at least four openings, at least five openings, and in particular versions six or more openings. The present subject matter includes the use of one or more viewing windows instead of, or in addition to, the noted openings.

The drain cleaning 10 also comprises a drum cover 70. The drum cover 70 includes a front 72, a rearwardly extending circumferential wall 76, and one or more wall regions 74 extending between the front 72 and the circumferential wall 76. It will be understood that in no way is the present subject matter limited to drum covers such as cover 70 having the particular configuration as described. Instead, the present subject matter includes a wide array of shapes, sizes, and configurations of the drum cover 70.

The drain cleaner 10 also includes a cable port 90 through which the drain cleaning cable 14 is accessed. Typically, the port 90 is concentrically located and aligned with an axis of rotation of the drum 40.

The drum cover 70 is releasably attached to the housing 20 or other component(s) of the drain cleaner 10 by one or more cover affixment provisions such as 84 shown in the referenced figure. The cover affixment provisions can be in the form of an over-center clamp or latch and/or use screw (s).

Figure 2:
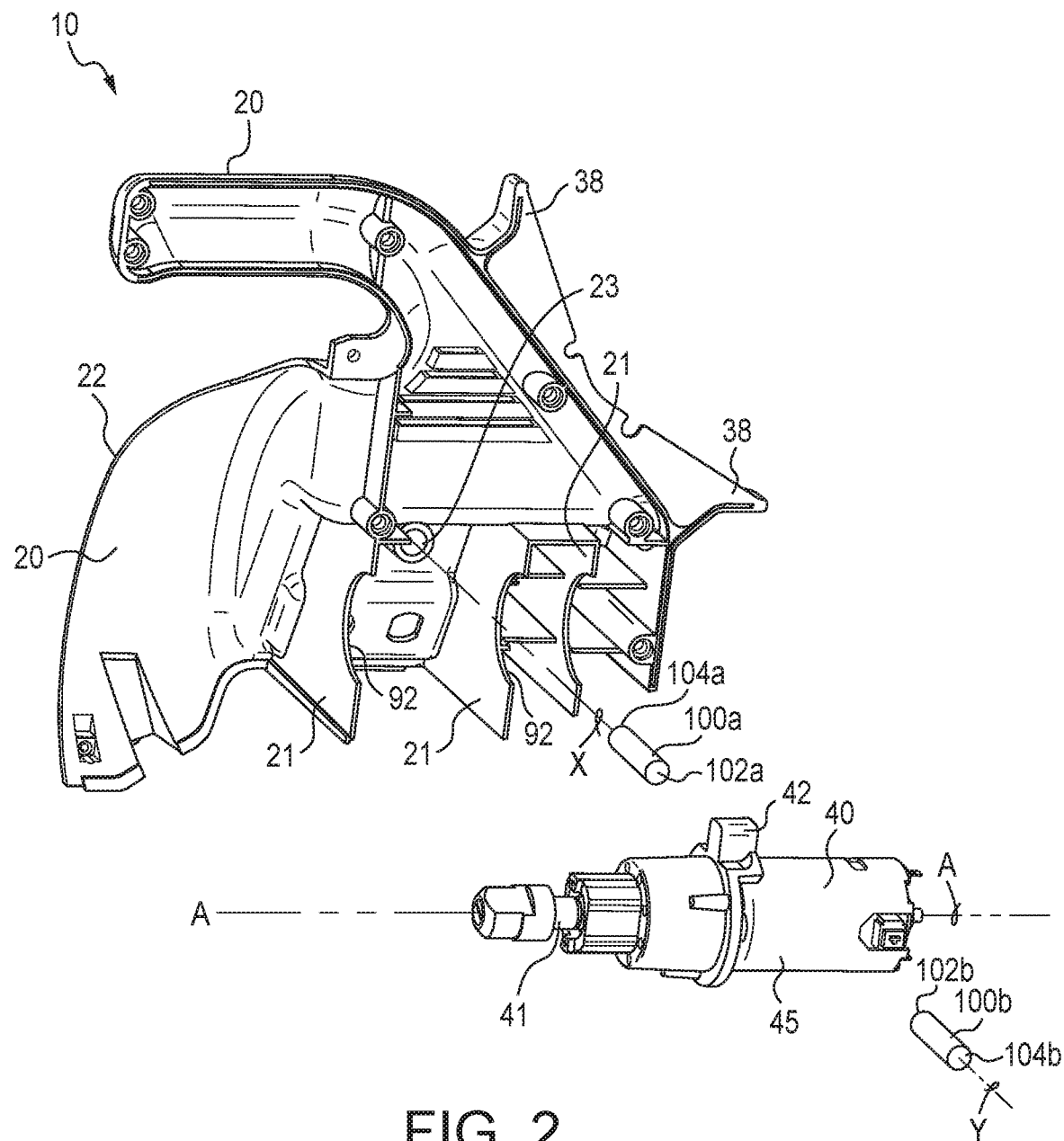
FIG. 2 is an exploded assembly view showing a portion of a housing, a motor, and dampening provisions in accordance with the present subject matter.

FIG. 2 is an exploded assembly view illustrating a portion 22 of the housing 20 of the drain cleaner 10 depicted in FIG. 1. FIG. 2 also illustrates a motor 40, and dampening provisions 100 for example 100a and 100b, in accordance with the present subject matter. The motor includes a drive shaft 41 rotatable about a center axis A, a torque countering member 42, and a motor enclosure 45. The portion 22 of the housing 20 includes one or more cradle members 21 for supporting the motor 40. Typically, each cradle member 21 defines a motor contact surface 92 that engages or otherwise contacts the motor 40 upon mounting or incorporation of the motor 40 within an interior region of the housing 20. The motor contact surface(s) 92 are shaped to fittingly receive the motor 40 and more specifically the motor enclosure 45. The housing 20 and/or the housing portion 22 also include one or more dampener receptacle(s) 23 accessible within the interior of the housing 20 and proximate the motor 40. Each receptacle 23 is sized and shaped to receive and engage a dampener such as dampener 100a depicted in FIG. 2. In the embodiment shown, the motor 40 is enclosed by two housing portions 22 and is positioned between two dampeners 100a and 100b, each dampener 100a and 100b being received and engaged in a corresponding receptacle 23. Each dampener defines a proximal end 102 adjacent the motor 40, and a distal end 104 adjacent the housing 20 or portion 22 thereof.

Figure 3:
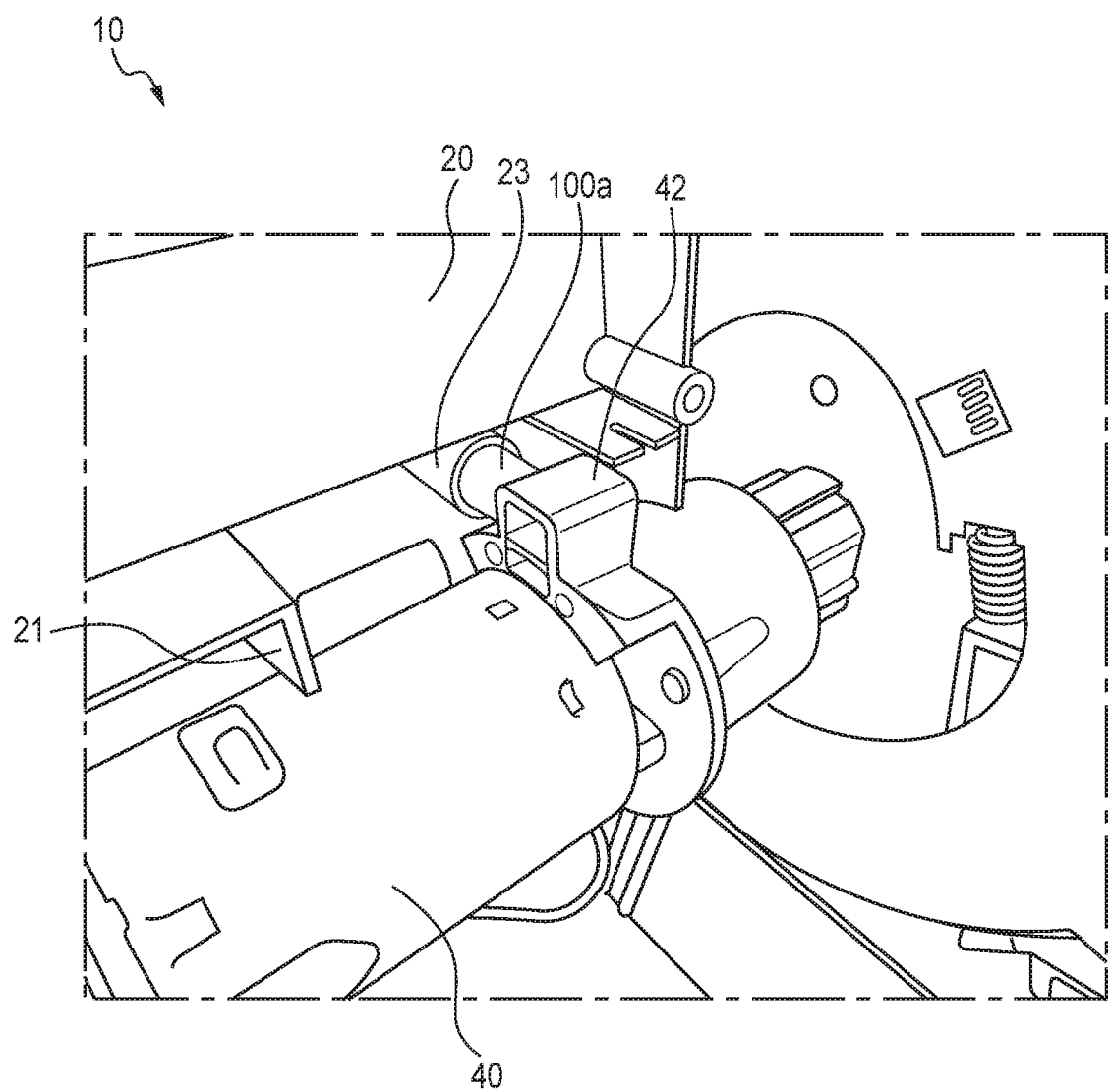
FIGS. 3-5 are detailed views further illustrating a mounting configuration of the motor within the housing.
Figure 4:
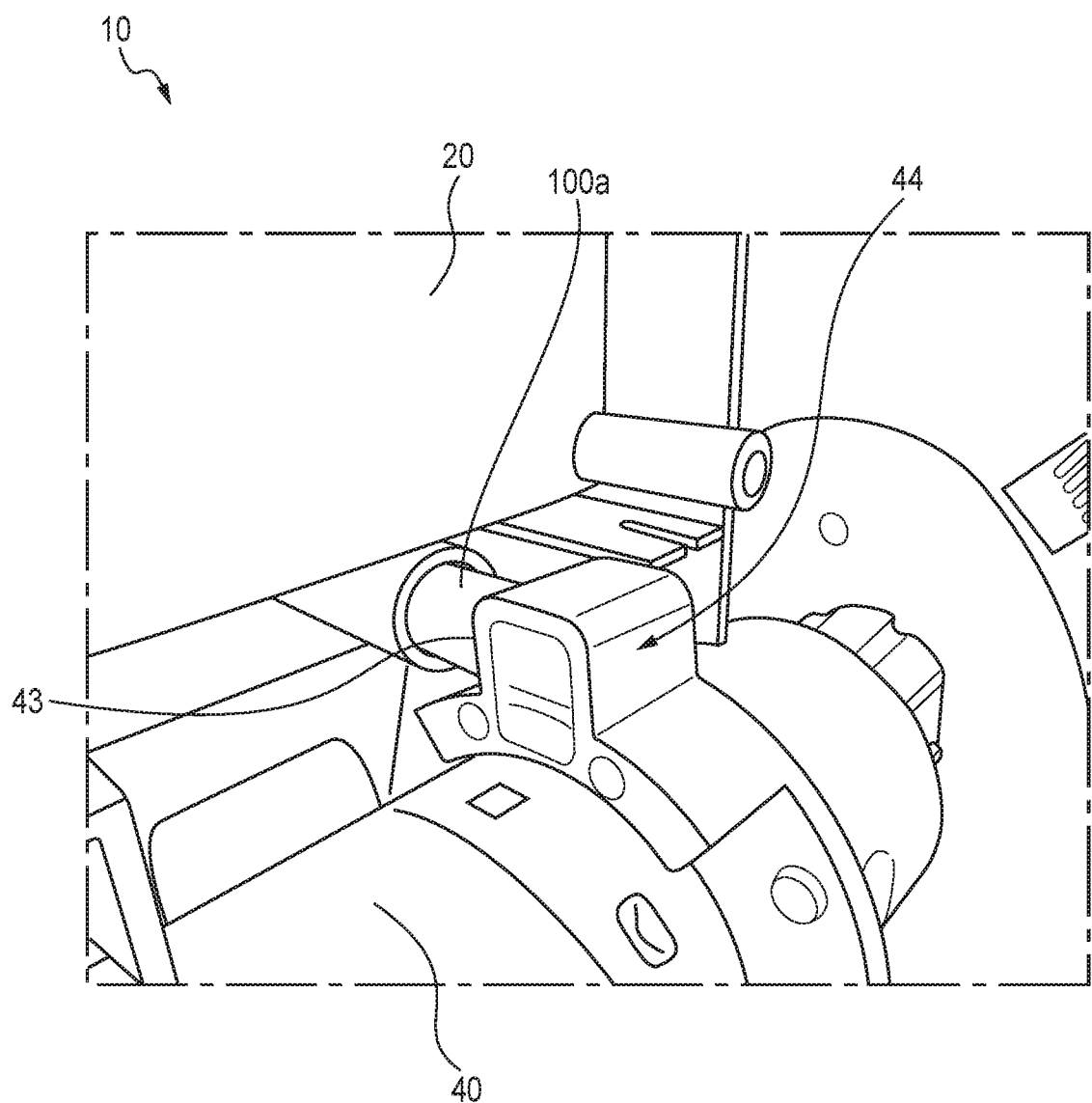
Figure 5:
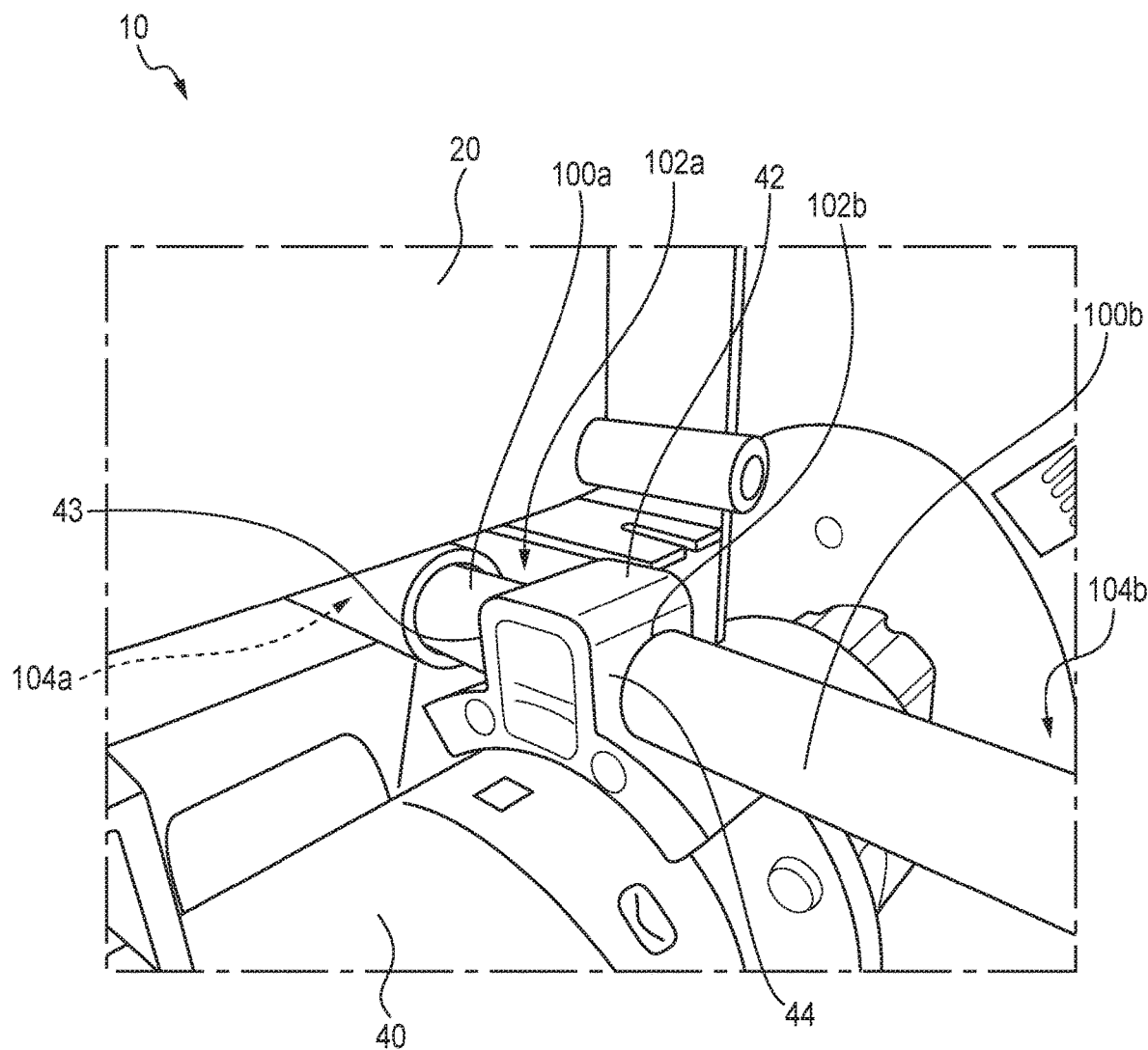

FIGS. 3-5 illustrate a mounting configuration of the motor 40 within the housing 20 of the drain cleaner 10. Specifically, the motor 40 is mounted and/or supported within the interior of the housing 20 by the cradle(s) 21. An outwardly projecting torque countering member 42 of the motor 40 is captured by being positioned between dampeners 100a and 100b as shown in FIG. 5. In a particularly preferred configuration, the orientation of the motor 40 within the housing 20 is such that the first dampener 100a is oriented along an axis such as axis X in FIG. 2, which is transverse to an axis of rotation of the motor 40, depicted in FIG. 2 as axis A. For embodiments using two or more dampeners, it is also preferred that a second dampener such as 100b shown in FIG. 2 is also oriented along an axis transverse to the axis of rotation of the motor. This configuration is shown in FIG. 2 as the second dampener 100b being oriented along axis Y which is transverse to axis A of the motor 40, Referring to FIGS. 5 and 6, dampener 100a is disposed in the receptacle 23 of the housing 100, and more particularly a distal end 104a of the dampener 100a is disposed within the receptacle 23. A proximal end 102a of the dampener 100a contacts a face 43 of the torque countering member 42. Dampener 100b is similarly disposed in another receptacle (not shown in FIG. 5) and more particularly a distal end 104b of the dampener 100b is disposed within that dampener. A proximal end 102b of the dampener 100b contacts a face 44 of the torque countering member 42. Face 44 is oppositely directed relative to face 43. In a preferred embodiment, the longitudinal axes, i.e., X and Y, of both dampeners 100 and 100b are parallel with each other. In a particularly preferred embodiment, the longitudinal axes, i.e., X and Y, of both dampeners 100a and 100b are (i) colinear with each other, and/or (ii) transverse to the axis of rotation of the motor. In certain versions, the dampeners are oriented such that both conditions (i) and (ii) occur.

Figure 6:
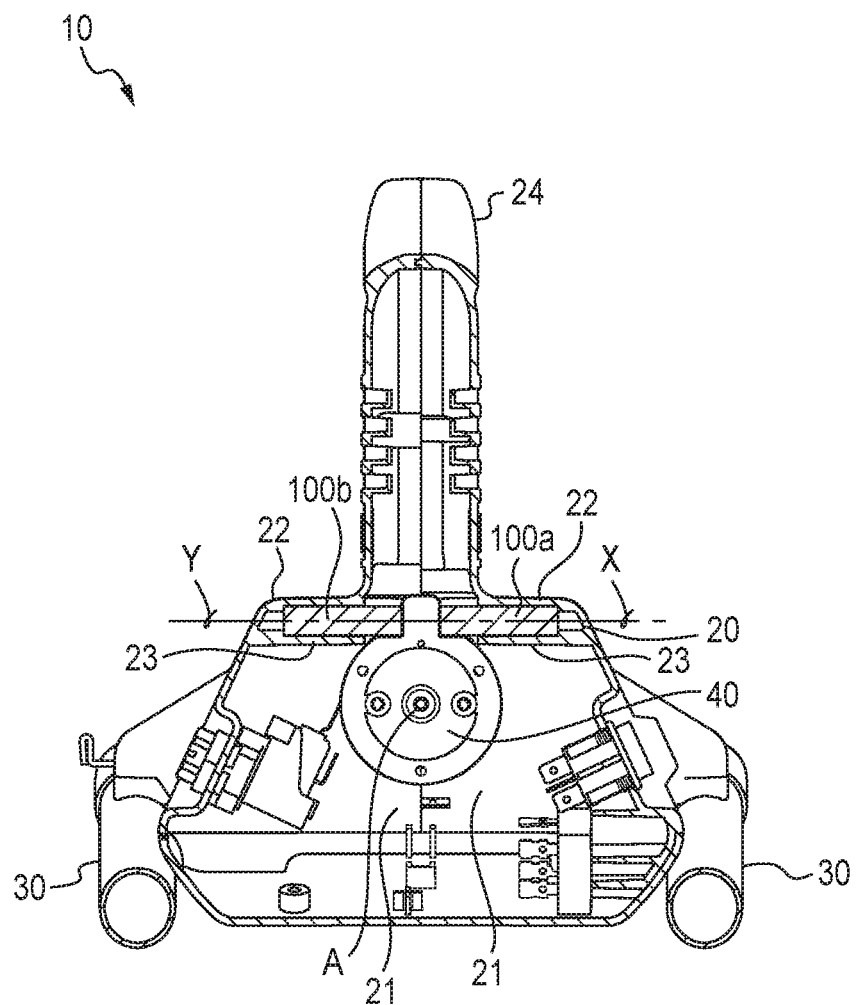
FIG. 6 is a cross sectional view of the drain cleaning tool depicted in FIG. 1 further illustrating the motor and its mounting within the housing.

The lengths of the dampeners are sufficient so as to suitably constrain the motor within the housing of the machine. In many embodiments, the lengths of all dampeners used in a machine are equal. The present subject matter has been primarily described using one or two dampeners. However, it will be understood that the present subject matter includes the use of three, four, five, six, or more dampeners in association with a motor and drain cleaner, FIG. 6 is a cross sectional view of the drain cleaner 10 shown in FIG. 1 further illustrating the motor 40 mounted within the housing 20, the dampeners 100a and 100b, and their arrangement within the housing 20. In the particular embodiment illustrated, the longitudinal axes X and Y of dampeners 100a and 100b respectively, are colinear with each other, and are both transverse to the axis of rotation of the motor 40, i.e., axis A. Also, in this embodiment, the axes X and Y are spaced from the axis A.

Although the present subject matter has been described in terms of drive trains and drain cleaning machines which are free of a clutch, it is contemplated that the present subject matter could be utilized in conjunction with drive trains and/or drain cleaning tools using clutches.

Many other benefits will no doubt become apparent from future application and development of this technology.

All patents, applications, standards, and articles noted herein are hereby incorporated by reference in their entirety.

The present subject matter includes all operable combinations of features and aspects described herein. Thus, for example if one feature is described in association with an embodiment and another feature is described in association with another embodiment, it will be understood that the present subject matter includes embodiments having a combination of these features.

As described hereinabove, the present subject matter solves many problems associated with previous strategies, systems and/or devices. However, it will be appreciated that various changes in the details, materials and arrangements of components, which have been herein described and illustrated in order to explain the nature of the present subject matter, may be made by those skilled in the art without departing from the principle and scope of the claimed subject matter, as expressed in the appended claims.

What is claimed is:

1. A clutch-free drive system, the system comprising:
a motor having a drive shaft rotatable about a center axis, and a motor enclosure;
a rigid torque countering member extending radially outward from the motor enclosure;
a dampener member contacting the torque countering member and spaced from the center axis of the motor;
wherein the drive system is free of a clutch.

2. The clutch-free drive system of claim 1 wherein the dampener member defines a longitudinal axis and the dampener member is oriented such that the longitudinal axis is transverse to the center axis of the motor.

3. The clutch-free drive system of claim 1 wherein the dampener member includes an elastomeric material.

4. The clutch-free drive system of claim 1 wherein the dampener member is a first dampener member and contacts a first side of the torque countering member, the system further comprising:
a second dampener member contacting a second side of the torque countering member, the second side being oppositely directed from the first side of the torque countering member, the second dampener member spaced from the center axis of the motor.

5. The clutch-free drive system of claim 4 wherein the second dampener defines a longitudinal axis and the second dampener member is oriented such that the longitudinal axis of the second dampener member is transverse to the center axis of the motor.

6. The clutch-free drive system of claim 5 wherein the longitudinal axis of the first dampener member is parallel with the longitudinal axis of the second dampener member.

7. The clutch-free drive system of claim 5 wherein the longitudinal axis of the first dampener member is collinear with the longitudinal axis of the second dampener member.

8. The clutch-free drive system of claim 5 wherein the second dampener member includes an elastomeric material.

9. A clutch-free drive system, the system comprising:
- a motor having a drive shaft rotatable about a center axis, and a motor enclosure;
- a rigid torque countering member extending outward from the motor enclosure;
- a dampener member contacting the torque countering member and spaced from and offset from the center axis of the motor;
- wherein the drive system is free of a clutch.

10. The clutch-free drive system of claim 9 wherein the dampener member defines a longitudinal axis and the dampener member is oriented such that the longitudinal axis is transverse to and spaced from and offset from the center axis of the motor.

11. The clutch-free drive system of claim 9 wherein the dampener member includes an elastomeric material.

12. The clutch-free drive system of claim 9 wherein the dampener member is a first dampener member and contacts a first side of the torque countering member, the system further comprising:
- a second dampener member contacting a second side of the torque countering member, the second side being oppositely directed from the first side of the torque countering member, the second dampener member spaced from and offset from the center axis of the motor.

13. The clutch-free drive system of claim 12 wherein the second dampener defines a longitudinal axis and the second dampener member is oriented such that the longitudinal axis of the second dampener member is transverse to and spaced from and offset from the center axis of the motor.

14. The clutch-free drive system of claim 13 wherein the longitudinal axis of the first dampener member is parallel with the longitudinal axis of the second dampener member.

15. The clutch-free drive system of claim 13 wherein the longitudinal axis of the first dampener member is collinear with the longitudinal axis of the second dampener member.

16. The clutch-free drive system of claim 13 wherein the second dampener member includes an elastomeric material.

* * * * *